May 7, 1929. T. L. ROBINSON 1,712,231

CAGE FOR ANTIFRICTION BEARINGS

Filed July 25, 1927

Inventor

Thomas L. Robinson

By John G. ___
Attorney

Patented May 7, 1929.

1,712,231

UNITED STATES PATENT OFFICE.

THOMAS L. ROBINSON, OF VALPARAISO, INDIANA.

CAGE FOR ANTIFRICTION BEARINGS.

Application filed July 25, 1927. Serial No. 203,119.

This invention relates to ball spacing cages for antifriction bearings of the annular type and that are interposed between the inner and outer annular raceways for the purpose of maintaining the balls in proper spaced relation, and particularly to cages suitable for double row bearings wherein two rows of balls function independently.

There are many types of cages for this purpose made in various manners, materials and number of pieces. In all such constructions, pockets or chambers are provided that partially surround the balls, contacting with their surfaces at various points. In some instances cages are made in two parts for each race of balls and riveted or locked together. Such a construction requires the insertion of the inner cage portions, in a double row bearing, before the balls are inserted, the outer cage portions being inserted thereafter, evidently a difficult and slow moving operation. Again, there are one piece cages, two of which are inserted between the raceways of a two row bearing before the balls are inserted, with some provision for deforming portions of the cages from the outside to effect locking. This latter type makes it extremely difficult to move the raceways eccentric of each other to insert the desired number of balls.

One object of my invention is to devise a one piece cage that can be readily assembled in a bearing and locked in place without any possibility of deforming any of the ball pockets. A further object is to make possible the locking of the cage in place by an operation performed from the opposite side of the bearing to which the cage is inserted without holes, notches or special provisions in the raceways to permit the locking operation.

With the above and other objects in view, my invention consists of the arrangement, combination and construction of the various elements of my improved device as described in the specification, claimed in my claims and shown in the accompanying drawings, in which Fig. 1 depicts a double row bearing with the outer raceway partially removed disclosing some of the balls, an unlocked cage, a locked cage and a tool indicating the method of locking.

Figure 1:
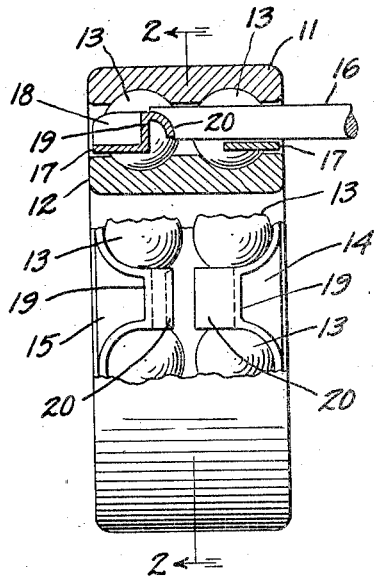

In the drawings 11 is the outer raceway and 12 is the inner raceway of a double row annular ball bearing. 14 is an embodiment of my cage as it is inserted between the raceways 11 and 12 after the balls 13 have been inserted, and 15 depicts the appearance of the cage after the locking operation has been performed by the locking tool or punch 16. 17 is a cylindrical base band or ring whose axis coincides with the axis of the bearing. 18 are ball pockets integral with the base ring 17, and 19 are partitions between adjacent ball pockets, one of which is omitted as at 21. The ball pockets are preferably formed by providing a plurality of adjacent notches in the inner edge of each of the bands or rings 17, each notch to receive one of the balls 13. The inner edge of each notch is bounded by a radially extending wall or flange. The ends of adjacent walls are connected by the partitions 19, as shown, whereby the ball pockets are provided. 20 are deformable elements projecting from the outer edges of the partitions 19.

Figure 2:
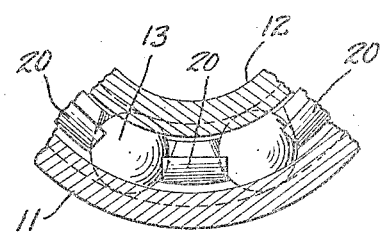
Fig. 2 is a section taken on line 2—2 of Fig. 1 showing two balls and the locking elements in final position.
Figure 3:
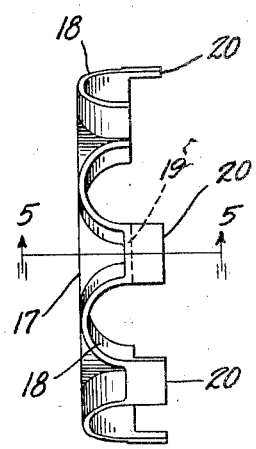
Fig. 3 is an edgewise view of a single cage ready for assembly.
Figure 4:
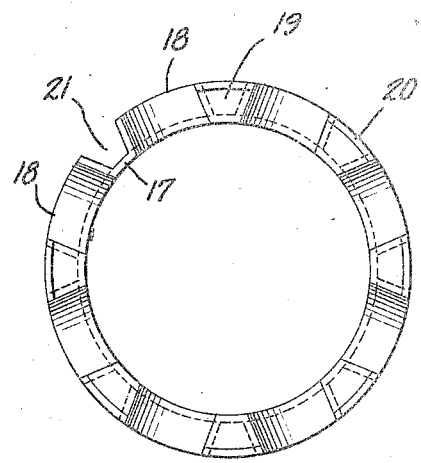
Fig. 4 is a side view of Fig. 3 looking into the open ball pockets with the locking elements in their original position.

The ball pockets 18, by preference, are semi-cylindrical in form with their axes radial to the center of the bearing. The side walls of the pockets 18 extend beyond the centers of the balls 13 and since the axes of pockets are radial, adjacent walls of adjacent pockets will be at a considerable angle to each other, the walls therefor being farther apart at their outer ends than at the centers of the balls. The locking elements 20, being adjacent the outer ends of the pockets, have a circumferential dimension greater than the closest distance between adjacent balls. Thus it will be seen that when the elements 20 are bent downwardly as shown in Figs. 1 and 2, they will overlap adjacent balls and hold the cage in place laterally. If spherical ball pockets were employed the elements 20 would be still wider. In any event, the width of the elements 20 can be predetermined as being just sufficient to properly lock the cage in place, and it is not always necessary to have the circumferential dimension of the elements 20 as great as the entire distance between pocket openings.

Figure 5:
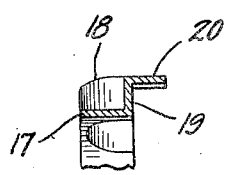
Fig. 5 is a section taken on line 5—5 of Fig. 3 showing a single locking element in its original position.

In the original form, before locking, the elements 20 project at right angles to the partitions 19 as clearly shown in Fig. 5. When the balls 13 are in place and the cages put into their proper places, the locking tool 16 is inserted through the space 21 in one cage and brought into contact with an element 20 of the opposite cage. With the opposite cage properly supported, a blow or pressure applied to the tool 16 will bend the element 20 inwardly as shown, conforming to the specially shaped end of the tool 16, as shown. Any tendency of the tool 16 to move outwardly away from the element will be resisted by contact with the outer raceway 11. Now with the tool 16 still in the open space 21 in the first cage, the second cage is worked around until each of its elements 20 have been bent down into final position, whereupon the tool 16 is withdrawn and inserted through the space 21 in the second cage and the elements 20 of the first cage are bent down into their final form and the assembly is completed.

If desired the second cage need not have the open space 21 and need not be in place when locking the first cage for obvious reasons, but such a program would make the two cages unlike as the first cage would necessarily have to have the open space. Making the cages duplicate spells for economical quantity manufacture.

While the elements 20, when locked, prevent the cage from working out of place in an axial direction, they also serve to locate the cage radially in a concentric position, thereby preventing the base ring 17 from rubbing on the inner raceway 12 should there be any tendency for the cage to move in that direction. It should also be noted that since the elements 20 project principally from the partitions 19 and are connected to the pocket walls 18 only where the pockets are joined and braced by the partitions 19, the bending of the elements 20 will not deform the ball pockets.

The absence of one partition and a corresponding locking element does not weaken the structure or disturb the function of the cage, as the element 20 on either side of the vacant space 21 are sufficient to securely lock on the balls on either side of the vacant space. To offset any lack of running balance occasioned by the vacant space, additional metal may be added at the proper point to compensate.

My construction affords an extremely simple, strong cage that lends itself readily to die casting, with the particular advantage that the size and shape of the ball pockets can be predetermined and maintained without any possibility of distortion during assembly. Locking the cage from the side opposite to that from which it is inserted, permits adequate bracing of adjacent ball pockets by suitable partitions preventing deformation, which would be impossible in a construction where the assembling and locking operations must be performed from the same side through openings between all pockets, such openings inviting distortion of ball pockets. It will be noted in my construction, that where I leave an opening between one pair of pockets, there is no element to be bent down and possibly deform the unsupported pocket walls adjacent that opening.

It will now be apparent that I have devised a new and useful construction in a very simple manner. Obviously changes in detail can be made by anyone skilled in the art, without departing from the spirit of the invention, and I do not care to limit myself to any particular arrangement of the elements.

I claim:

1. A spacing cage for ball bearings comprising in one piece a cylindrical base ring having ball pockets extending outwardly therefrom and beyond the centers of the balls, partitions joining adjacent pockets also extending outwardly from said base ring and substantially parallel to a plane through the ball centers, locking elements projecting from the outer edges of said partitions in a direction away from said pockets, said locking elements adapted to be bent toward the ball centers locking said cage in place.

2. A spacing cage for ball bearings comprising in one piece a cylindrical base ring having ball pockets extending outwardly therefrom and beyond the centers of the balls, partitions joining adjacent pockets and also extending outwardly from said base ring and substantially parallel to a plane through the ball centers, locking elements projecting laterally from the said partitions, said locking elements adapted to be bent toward the ball centers locking said cage in place, said locking elements being accessible only from the side of the bearing opposite to that from which said cage is inserted.

3. A spacing cage for a double row ball bearing comprising in one piece a base ring, ball pockets extending outwardly therefrom, partitions joining said pockets also extending outwardly from said base ring and locking elements extending from said partitions, the arrangement of said ring, pockets, partitions and elements being such that said cage is insertible in said bearing from the outside thereof and said elements only accessible for bending and locking said cage in place from a point opposite to the side from which said cage is inserted.

4. A spacing cage for a double row ball bearing comprising in one piece a cylindrical base ring having ball pockets extending outwardly therefrom and beyond the centers of the balls, partitions of lesser number than ball pockets joining adjacent pockets and also extending outwardly from said base ring and beyond the ball centers and substantially parallel to a plane through the ball centers, locking elements projecting laterally from said partitions in a direction away from said pockets, the absence of a partition forming an aperture only wherethrough the locking elements of an opposite and similar cage are accessible for locking said opposite cage in place.

5. A spacing cage for ball bearings comprising a substantially cylindrical base band having ball receiving notches along one edge, the edges of said notches being bounded by radially extending walls, adjacent ends of said walls being connected by partitions; and pliable locking elements projecting from the outer edges of said partitions and adapted and arranged to be bent inwardly between adjacent balls in said notches to hold the same in place.

6. A spacing cage for ball bearing comprising a substantially cylindrical base band having ball receiving notches along one edge, the edges of said notches being bounded by radially extending walls, alternate adjacent ends of said walls being connected by partitions; and pliable locking elements projecting from the outer edges of said partitions and adapted and arranged to be bent inwardly between adjacent balls in said notches to hold the same in place.

THOMAS L. ROBINSON.